US011308656B1

(12) United States Patent
Chu et al.

(10) Patent No.: US 11,308,656 B1
(45) Date of Patent: Apr. 19, 2022

(54) POWER LINE EXTRACTION USING REFERENCE DATA

(71) Applicant: International Business Machines Corporation, Armonk, NY (US)

(72) Inventors: Linsong Chu, White Plains, NY (US); Mudhakar Srivatsa, White Plains, NY (US); Raghu Kiran Ganti, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 17/098,498

(22) Filed: Nov. 16, 2020

(51) Int. Cl.
  *G06T 11/00* (2006.01)
  *G06V 10/22* (2022.01)
  *G06V 20/10* (2022.01)

(52) U.S. Cl.
  CPC .............. *G06T 11/00* (2013.01); *G06V 10/22* (2022.01); *G06V 20/182* (2022.01); *G06V 20/188* (2022.01); *G06T 2210/56* (2013.01)

(58) Field of Classification Search
  None
  See application file for complete search history.

(56) References Cited

U.S. PATENT DOCUMENTS

| 8,396,293 | B1 | 3/2013 | Korah et al. |
| 9,384,399 | B2 | 7/2016 | Bangay |
| 9,734,398 | B2 * | 8/2017 | Chen .................... G06V 20/182 |
| 9,784,836 | B2 | 10/2017 | Heinonen et al. |
| 10,643,072 | B2 | 5/2020 | Kottenstette et al. |
| 2012/0027298 | A1 | 2/2012 | Dow et al. |
| 2013/0066600 | A1 * | 3/2013 | Rousselle ................ H02J 3/00 703/1 |

(Continued)

FOREIGN PATENT DOCUMENTS

| CN | 103413133 B | 10/2014 |
| CN | 104020475 A | 3/2016 |

(Continued)

OTHER PUBLICATIONS

Fryskowska, "Improvement of 3D Power Line Extraction from Multiple Low-Cost UAV Imagery Using Wavelet Analysis"; Sensors 2019, 19, 700. 24 Pages.
Guan-et al. "Extraction of power-transmission lines from vehicle-borne lidar data"; In International Journal of Remote Sensing, 2016; vol. 37, No. 1, 229-247. 21 pages.

(Continued)

*Primary Examiner* — Nurun N Flora
(74) *Attorney, Agent, or Firm* — Cantor Colburn LLP; Joseph Petrokaitis

(57) ABSTRACT

Aspects of the invention include receiving a point cloud data set describing a target area. Receiving a first parameter describing a power line segment at an original location within the target area. Using the processor to extract from the point cloud data set a power line segment at an updated location distinct from the original location, wherein analysis of each candidate data point of the point cloud data set is constrained by the first parameter, and wherein the first parameter causes the power line segment at the updated location to be parallel with the power line segment at the original location. Generating a vector describing the updated location of the power line segment with respect to geospatial coordinates of the target area.

20 Claims, 7 Drawing Sheets

(56) References Cited

U.S. PATENT DOCUMENTS

| | | | | |
|---|---|---|---|---|
| 2015/0131079 A1* | 5/2015 | Heinonen | ......... | G06Q 10/0631 356/4.01 |
| 2019/0235011 A1* | 8/2019 | Pinney | ................ | G01B 11/026 |
| 2019/0317239 A1* | 10/2019 | Olsson | .................... | G01V 3/12 |
| 2019/0382111 A1* | 12/2019 | Schwartz | ............. | B64C 39/024 |
| 2020/0074176 A1 | 3/2020 | Birchbauer et al. | | |
| 2020/0184194 A1 | 6/2020 | Edara et al. | | |
| 2021/0073692 A1* | 3/2021 | Saha | .................... | G08B 17/005 |

FOREIGN PATENT DOCUMENTS

| | | |
|---|---|---|
| CN | 104751481 B | 6/2016 |
| CN | 104484882 B | 9/2017 |
| CN | 110221603 A | 9/2019 |
| CN | 111159451 A | 5/2020 |
| CN | 111650599 A | 9/2020 |
| CN | 111680673 A | 9/2020 |
| KR | 101404655 B1 | 6/2014 |

OTHER PUBLICATIONS

Lehtomäkiaet al. "Power line mapping technique using all-terrain mobile laser scanning"; Automation in Construction 105 (2019) 102802. 16 Pages.

Wang-etal, "Supervised Classification of Power Lines from Airborne LiDAR Data in Urban Areas"; Remote Sens. 2017, 9, 771. pp. 16.

Zhao et al. "Power Line Extraction From Aerial Images Using Object-Based Markov Random Field With Anisotropic Weighted Penalty" IEEE Access; 2019, vol. 7, pp. 125333-125356 24 Pages.

Chu et al., "Power Line Georectification," U.S. Appl. No. 17/098,501, filed Nov. 16, 2020.

IBM "List of IBM Patents or Patent Applications Treated as Related; (Appendix P)", Filed Nov. 16, 2020, 2 pages.

International Search Report and Written Opinion; dated: Jan. 12, 2022; Application No. PCT/CN2021/123781; Filed: Oct. 14, 2021; 10 pages.

* cited by examiner

POWER LINE EXTRACTION USING REFERENCE DATA

BACKGROUND

The present invention relates in general to programmable computing systems, and more specifically, to programmable computing systems configured to perform power line extraction using reference data.

Energy companies and municipalities use locations of power lines as decision making criteria for various initiatives, such as mitigating the possibility of any surrounding vegetation interacting with power lines. Due to the expansive footprint of many power line systems, on-site inspections can be expensive and subject to human error. Instead, the companies and municipalities rely on computing systems that are programmed to receive image data to differentiate and identify any power lines described by the data. The computing systems can further provide locations of the power lines by complementing the image data with spatial coordinates.

SUMMARY

Embodiments of the present invention are directed to power line georectification. A non-limiting example computer-implemented method includes receiving a point cloud data set describing a target area. Receiving a first parameter describing a power line segment at an original location within the target area. Using the processor to extract from the point cloud data set a power line segment at an updated location distinct from the original location, wherein analysis of each candidate data point of the point cloud data set is constrained by the first parameter, and wherein the first parameter causes the power line segment at the updated location to be parallel with the power line segment at the original location. Generating a vector describing the updated location of the power line segment with respect to geospatial coordinates of the target area.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products that generate maps with updated locations of power lines by using parameters extracted from reference data with inaccurate locations of the power lines.

Energy companies and municipalities rely on maps of power lines for planning and risk management. For example, vegetation mitigation relies on understanding a distance between vegetation and a power line. Unfortunately, maps defining locations of power lines were generated when the ability to determine spatial coordinates of points of interest was not accurate. As a result, an actual power line can be located tens of meters away from a location described in reference map data.

One or more embodiments of the present invention address one or more of the above-described shortcomings by providing computer-implemented methods, computing systems, and computer program products that leverage reference data to provide a reference parameters to guide an extraction algorithm to focus on particular data points and extract power lines based on the smaller set of data points. This is because even though the reference data describes inaccurate locations of power lines, the reference power line locations are parallel to the actual power line locations. The extraction algorithm can use the reference data to analyze the newly acquired data and focus on candidate data points that form a line parallel to a power line from the reference data. This leads to fewer necessary computations and a more efficient power line extraction system.

Figure 1:
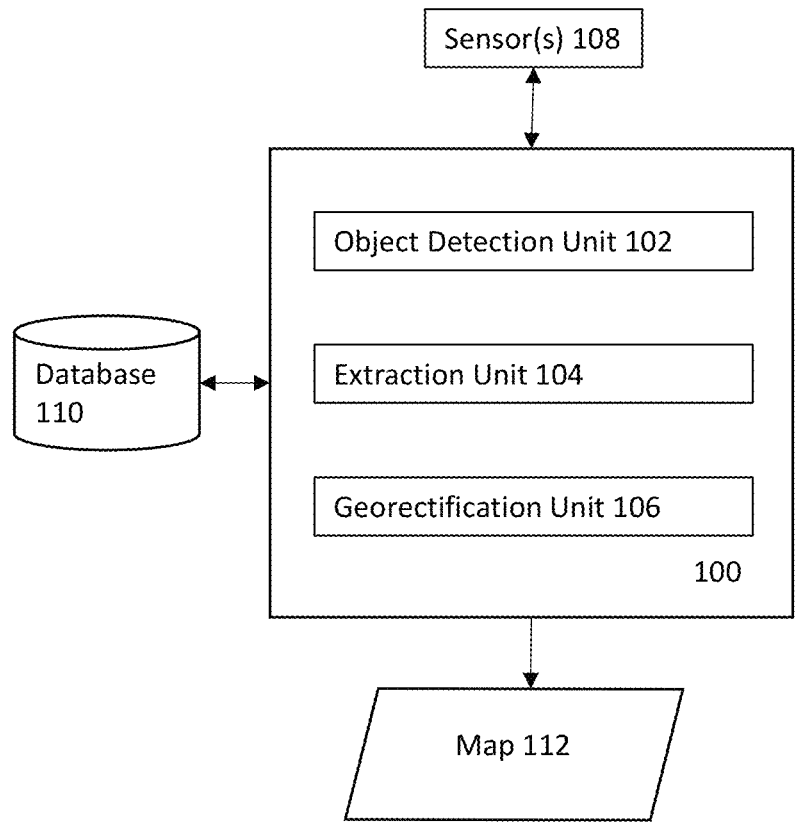
FIG. 1 illustrates a block diagram of components of a system for power line extraction in accordance with one or more embodiments of the present invention.

Turning now to FIG. 1, a power line extraction system 100 is generally shown in accordance with one or more embodiments of the present invention. The system 100 includes an object detection unit 102 for detecting candidate data points from image data that describe a power line. The system 100 includes an extraction unit 104 for receiving candidate data points from the object detection unit 102 and identifying power line(s). The extraction unit 104 is constrained by parameters extracted from reference data, which helps eliminate data points and reduces the amount of computation required. The system 100 includes a georectification unit 106 for associating the identified power line(s) with a coordinate system to identify a location of the power line. The georectification unit 106 can further generate coordinates in the form of a vector describing the location of one or more power lines. The georectification unit 106 is operable to use the coordinates produce an RBG map with updated locations of power lines. For example, a same red-blue-green RBG map as described by the reference data, but with updated power line locations. The system 100 is further operable to communicate with one or more sensor(s) for providing the image data. The system 100 is also in communication with a database 110 for providing image data and reference data. The reference data can include data describing an inaccurate location of a power line.

The object detection unit 102 is operable to receive input data describing a target location and extract candidate data points that potentially describe power lines. The object detection unit 102 can extract candidate data points through various methods. For example, the object detection unit 102 can translate a set of three-dimensional data points describing a three-dimensional terrain of a target location into a two-dimensional grid of pixels. The object detection unit 102 can use various techniques, for example, computer vision, and analyze each grid unit (e.g., pixel) to identify candidate data points. Candidate data point detection includes both image classification and object localization. Image classification includes predicting a class of one or more objects in the image, including candidate data points. To perform image classification, the object detection unit 102 receives the input data and outputs a class label for each grid unit as a whole in the form of one or more integer values mapped to class values. Object localization includes identifying a location of the one or more identified objects in the grid unit. To perform object localization, the object detection unit 102 can process the received input data and output one or more grid units (pixels), which define a two-dimensional spatial relationship of the objects in the input data In another embodiment of the present invention, the object detection unit 102 can analyze three-dimensional data points individually. Rather than using computer vision techniques on two-dimensional grid units, the object detection unit analyzes three-dimensional data points. The object detection unit 102 can analyze each data point, including a relation (e.g., distance, relative pixel intensity) between data points and generate a classification for each individual data point. Furthermore, the object detection unit 102 can further detect one or more parameters of each data point. The object detection unit 102 can identify a candidate data point from a set of data points based on one or more of these parameters. In yet other embodiments of the present invention, the object detection unit 102 can perform a hybrid method that applies grid-based techniques and point-based techniques.

The object detection unit 102 can be implemented through a neural network type architecture with input, hidden, and output layers. The object detection unit 102 can be trained to detect candidate data points from image data. For example, the object detection unit 102 can be trained to detect particular features, such as a height of a data point in relation to an underlying terrain, a density of data points, and other characteristics to identify candidate data points.

The extraction unit 104 is operable to receive the candidate data points from the object detection unit 102 and identify a power line. The extraction unit 104 can apply computer vision, image analysis, and/or image processing to identify power lines from candidate data points. The extraction unit 104 can use one or more of these techniques to extract features from the candidate data points that are indicative of power lines. However, even using machine learning, conventional power line extraction systems must sift through high-density point cloud data to identify power lines. This process has high computational costs and is expensive in terms of processing power required.

Embodiments of the present invention analyze reference data to extract parameters and generate a filter to remove candidate data points from further analysis. Reference data includes previously generated mapping data of power lines. The set of candidate data points that are filtered out do not need to be analyzed further, and the extraction unit 104 can focus on the remaining set of candidate data points. Therefore, the system 100 incurs fewer computational costs and preserves more processing power than conventional systems.

The extraction unit 104 can apply constraints to a line extraction algorithm to eliminate candidate data points based on the reference data. The reference data includes mappings of power line location, where, in many instances the locations are inaccurate. The mapping can include three-dimensional and two-dimensional mappings. However, notwithstanding the inaccuracies, the reference data includes valuable information for reducing the computational requirements for a power line extraction system. For example, a power line on a reference data may actually be twenty meters in some direction (e.g., north, south, east, or west) of an actual power line. However, even if the location is inaccurate, the power line described in the reference data is generally parallel with the actual power line. Additionally, the power line described in the reference data is generally within a threshold distance of the actual power line.

The extraction unit 104 can apply various algorithms that apply a statistical analysis of various features to extract power lines from the candidate data points. The various algorithms can include line-based algorithms, such a Hough Transform (HT) and random sample consensus (RANSAC). The Hough transform is a feature extraction technique used to extrapolate lines from image data. THE RANSAC algorithm is a method that applies statistical analysis to a set of candidate data points to remove outlier points (e.g., data points not along a power line).

The extraction unit 104 can execute the Hough transform to analyze each data point and represent a potential power line in Hough space as:

$$\rho = x \cos(\theta) + y \sin(\theta) \quad (1)$$

where $\rho$ is a magnitude of a normal line from a reference point to a candidate power line, $\theta$ represents an angle from a reference vector to the normal line, and x represents a variable along an x-axis, and y represents a variable along the y-axis. Collectively x and y represent a position of a point along a power line. Each candidate data point $(x_i, y_i)$ from point cloud data produces a cosine curve in the Hough space. Candidate data points that lie along the same line generate cosine curves that intersect based on a particular $(\rho, \theta)$. Therefore, the extraction unit 104 can map candidate data points to the Hough space and detect a number of intersections of the cosine curves. Based on a number of intersections, the extraction unit 104 an identify a power line.

The extraction unit 104 can select a value for $\theta$ based on the reference data. As described above, a power line from the reference data is presumed to be parallel to an actual location of a power line. Therefore, a value of $\theta$ can be an angle that causes a normal line of the Hough transform to be perpendicular to a power line, as described in the reference data. In a conventional system, each data point would be evaluated in terms of $\theta$ ranging from [0, 180]. However, the herein described extraction unit 104, uses the fixed $\theta$, to guide the Hough transform analysis of the candidate data points. The extraction unit 104 can also create an accumulator to represent the Hough space. The accumulator can be a table, in which the rows describe different values of ρ, and the columns describe different values of θ, or vice versa.

The extraction unit 104 detects any x, y position for each data point, and using the fixed θ, calculates an ρ for each candidate data point. The results are inputted into the accumulator, and for each instance that a particular (ρ, θ) combination is calculated, an associated cell in the accumulator can be incremented. For example, if a same (ρ, θ) value combination is calculated twice, a value of a cell representing the intersection of the calculated ρ value and θ value is incremented twice. The extraction unit 104 can analyze each cell in the accumulator to determine if the values have been incremented greater than a threshold amount. The threshold amount in a cell can be based at least in part on a number of candidate data points required to be sufficient to be considered a power line. For example, two data points may be indicative of line, but not necessarily a power line. However, a larger number points may be sufficient to considered a power line. The threshold number of candidate data points can be selected based on an extraction algorithm or user experience. If the value in a cell is greater than a first threshold amount, then the cosine curves intersect greater than a second threshold amount. If the value in a cell is not greater than the first threshold amount, then the cosine curves do not intersect greater than the second threshold amount. If the cosine curves intersect greater than the second threshold, and candidate data points lie along a power line. If the cosine curves do not intersect greater than the second threshold, then the candidate data points do not lie along a power line. The extraction unit 104 can translate the points from the Hough space back to a two-dimensional space and annotate image data to reflect the updated location of the power line.

Figure 2:
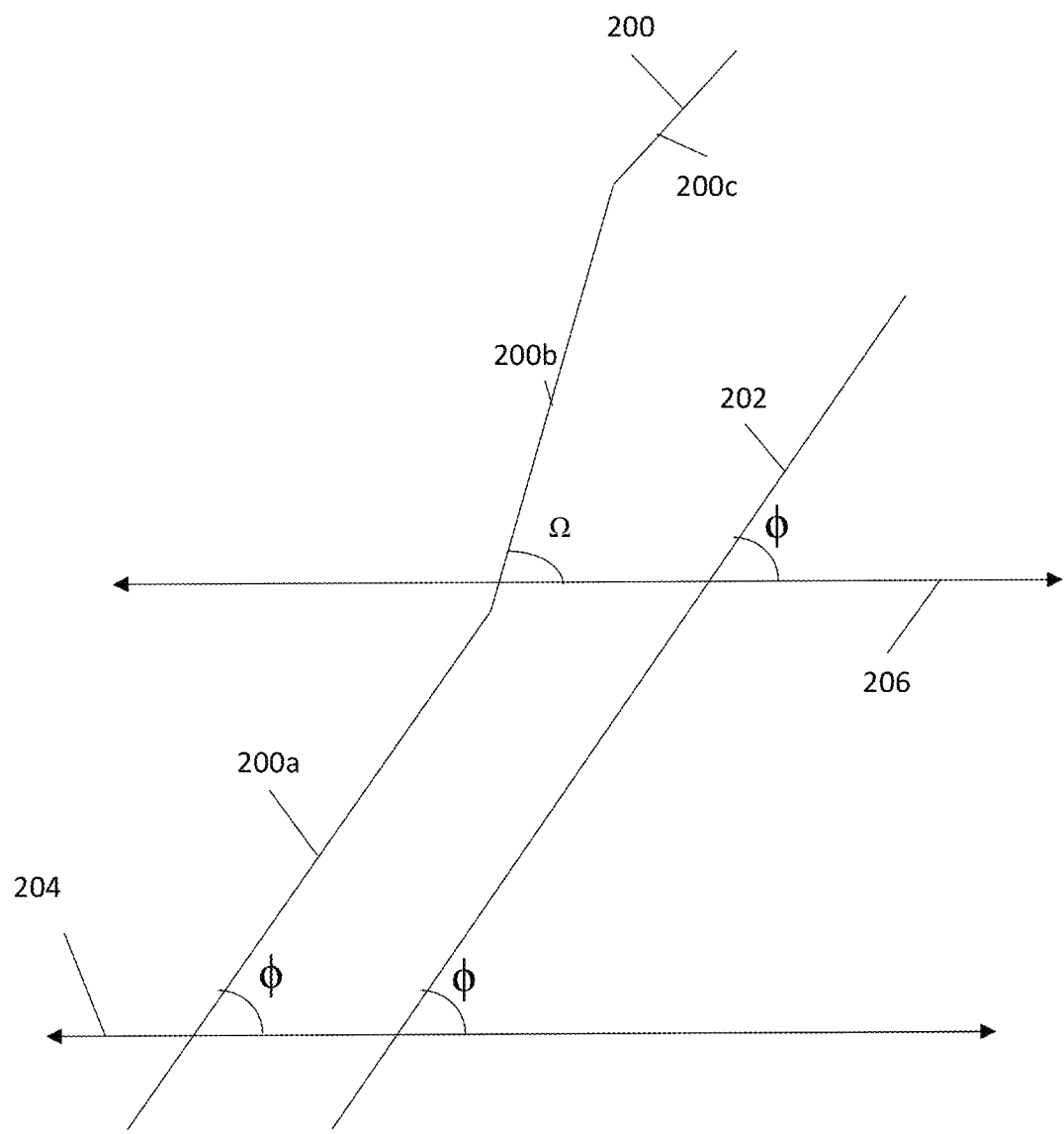
FIG. 2 illustrates an image of a power line in accordance with one or more embodiments of the present invention.

The extraction unit 104 can further remove competitor lines. Competitor lines are lines in an image that may resemble power lines, but are not power lines. For example, an overhead cable powering a streetcar in San Francisco may have an appearance of a power line, and may even run parallel to a power line, but is not a power line. Referring to FIG. 2, an illustration of a candidate power line 200 near an illustrated power line 202 as described in reference data. As illustrated, the candidate power line 200 is divided into three segments: a first segment 200a, a second segment 200b, and a third segment 200c. As illustrated, the extraction unit 104 has divided the candidate power line 200 into segments based on a directional change in the candidate power line 200. However, in other embodiments, the competitor line could be divided on other characteristics, such a length, landmarks, and positions. The reference data power line 202 is illustrated as a single segment. The extraction unit 104 can generate a reference vector(s) for each segment 200a 200b 200c of each identified line from the candidate data points. The reference vector(s) can traverse each segment 200a 200b 200c and the reference data power line 202.

The extraction unit 104 can further calculate an angle between each segment and a reference vector. As illustrated, the first segment 200a forms a same angle 4 as the reference data power line 202 in relation to a first reference vector 204. The first segment 200a is parallel with the reference data power line 202. Although, as illustrated, only two angles are shown, the extraction unit 104 can calculate any number of angles to determine whether two lines are parallel. However, as illustrated, the reference data power line 202 continues to form an angle φ in reference to a second reference vector 206, but the second segment 200b forms an angle Ω in reference to the second reference vector 206. If a difference between angle φ and angle Ω is greater than a third threshold amount, the extraction unit 104 can conclude that the candidate power line 200 is not parallel with the reference data power line 202 and the candidate power line 200 is a competitor line. If a difference between angle φ and angle Ω is less than the third threshold amount, the extraction unit 104 can conclude that the candidate power line 200 is parallel with the reference data power line 202, and the candidate power line 200 is not a competitor line.

The extraction unit 104 can further distinguish a power line and a competitor line based on a distance between a candidate power line and a power line described in the reference data. Even if an actual power line is located a distance from a power line at an inaccurate location in the reference data, the distance should be less than a threshold distance. This threshold difference can be empirically determined or based on user experience. The extraction unit 104 can calculate a distance between proximal endpoints of a candidate power line and reference power line. The extraction unit 104 can also calculate a distance between distal endpoints of a candidate power line and reference power line. The extraction unit 104 can then compare the two distances to a threshold distance. If either the distance between proximal ends or distal ends are is greater than a threshold value, then the candidate power line is a competitor line. If either the distance between proximal ends or distal ends are is less than the threshold value, then the candidate power line is not a competitor line.

The extraction unit 104 can be implemented through a neural network type architecture with input, hidden, and output layers. The extraction unit 104 can be trained to extract power lines based on candidate data points. For example, the extraction unit 104 can be trained to apply a Hough transform to analyze candidate data points to determine whether the candidate data points form a line parallel with a reference power line.

The georectification unit 106 can receive the identified power line data from the extraction unit 104 and associate the data with a geographic coordinate system. The georectification unit 106 can associate multiple points of interest in the identified power line data with known coordinates to coordinates in a geographic coordinate system. The balance of the points of interest in the image data are rectified with the geographic coordinate system based on the points of interest with known coordinates. Once the balance of the points of interest are rectified, the georectification unit 106 can generate a vector describing a location of the power lines with respect to the geographic coordinate system. The vector can be generated for various formats, such shapefile or GeoJSON. In some embodiments, the vector is generated to be compatible with a format of the reference data. The vector can be used to generate an RBG image of the location of the power lines. Through this process, the georectification unit 106 creates a map 112 with an updated location of the power lines.

The phrases "neural network" and "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using an object detection unit 102 and extraction unit 104 having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The object detection unit 102 and extraction unit 104 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the object detection unit 102 and extraction unit 104 that carry electronic messages between simulated neurons are provided with numeric weights that correspond to the strength or weakness of a given connection. During training, The weights can be adjusted and tuned based on experience, making the object detection unit 102 and extraction unit 104 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

The sensor(s) 108 can be any sensor operable to collecting image data. The image data can include any data or combination of data used to generate a two-dimensional or three-dimensional description of a target area, for example, a point cloud. The sensor(s) 108, for example, can include a remote imaging sensor such as a visible light capturing sensor, moderate-resolution imaging spectroradiometer (MODIS), airborne laser scanning (ALS) sensor, Visible Infrared Imaging Radiometer Suite (VIIRS), or a Light Detection and Ranging system (LIDAR) acquired at different wavelengths, that can capture spectral data. The data received from the sensor(s) 108 can include data that describes an elevation of a terrain of the target location, for example, digital terrain data. The terrain data can be used to calculate a height of a data point in relation to a topology of a target area. The terrain data can also be retrieved from an external source and combined with the data received from the sensor(s) 108.

Figure 3:
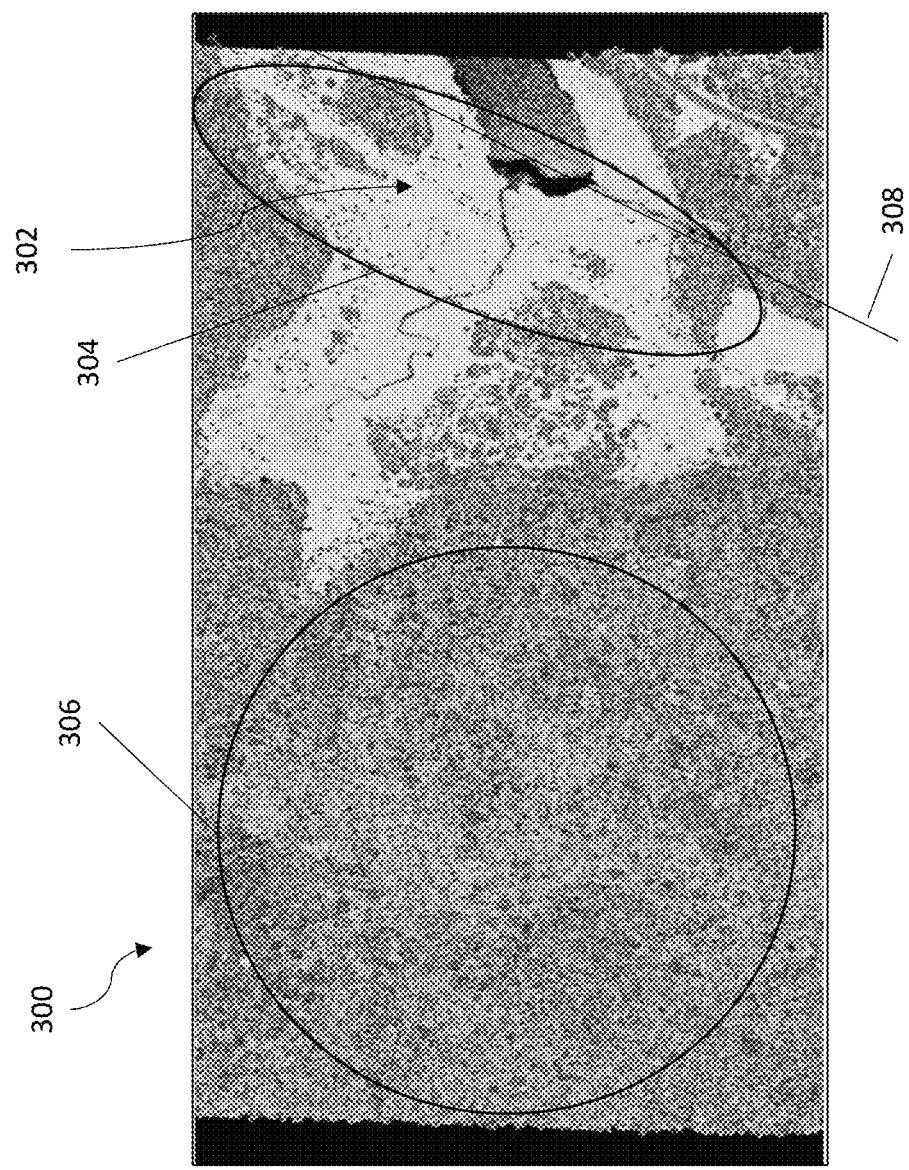
FIG. 3 illustrates an image of a power line and a competitor line in accordance with one or more embodiments of the present invention.

Referring to FIG. 3, a plan view image 300 of a data points 302 describing a target area is shown. The power line data points 302 are spaced apart, but would form a line describing a location of a power line if connected together. The power line data points 302 are encompassed in an oval 304 for illustration purposes. For further illustration, data points describing a dense vegetation are encompassed in a circle 306. As seen, the image 300 includes a data point density that ranges from densely populated vegetation to sparsely scattered objects. A conventional power line extraction system would have to calculate candidate power lines throughout the image. However, the herein described system 100 is constrained by the reference data to reduce the necessary calculations. For example, the system 100 can retrieve a location of a power line 308 from reference data, and calculate an azimuth of a segment of the reference power line 308 with respect to a reference vector. As seen in FIG. 3 the reference power line 308 is located over an inaccurate location and to the east of the actual power line. The reference power line 308 is, however, parallel to the actual location of the power line. As seen in FIG. 3, a threshold number of power line data points 302, if connected, would form a line parallel to the reference power line 308. Using the herein described methods, the system 100 can identify an updated location of the power line formed by the power line data points 302. The system 100 can further generate a map image 300 with highlighted graphics over the power line data points 302.

Figure 4:
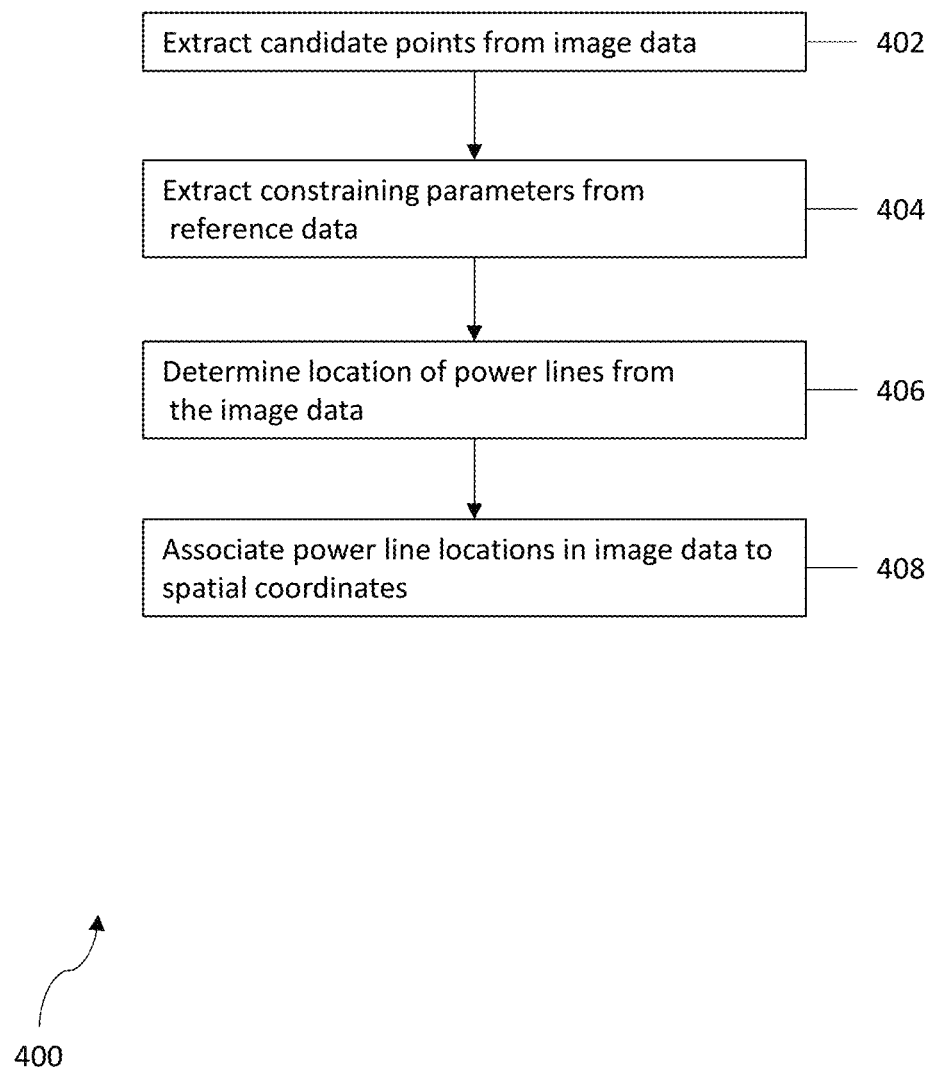
FIG. 4 illustrates a flow diagram of a process for power line extraction in accordance with one or more embodiments of the present invention.

Referring to FIG. 4, a flow diagram 400 of a process for power line extraction is shown in accordance with one or more embodiments of the present invention. It should be appreciated that all or a portion of the processing shown in FIG. 4 can be performed by a computer system, such as system 100 of FIG. 1. At block 402, an object detection unit 102 can extract candidate data points from image data. The object detection unit 102 can receive the image data in the form of point cloud data from one or more sensor(s) 108. The point cloud data is a set of data points describing a three-dimensional space, for example, a target area that includes a power line. The object detection unit 102 can analyze the data points in the point cloud data individually to determine which data points are candidate data points. The object detection unit 102 can analyze each data point, including a relation (e.g., distance, relative intensity) between data points and generate a classification for each individual data point. The object detection unit 102 can identify candidate data based on various characteristics such as comparison with a threshold range of height values, an absence of data points above, below, or to a side of a candidate data point, a density of data points surrounding a candidate data points. The object detection unit 102 can further compare a height of a data point to a threshold range of height values. If, for example, the object detection unit 102 can determine that the height is greater than an upper limit or less than a lower limit, the data point is not a candidate data point. If the object detection unit 102 can determine that the distance is within the range, the data point is a candidate data point.

At block 404, the extraction unit 104 can extract constraining parameters from reference data. The extraction unit 104 can receive reference data from one or more sources, including a database 110. The reference data includes previously determined location of power lines. The reference data can further include inaccurate locations of the power lines. The extraction unit 104 can extract constraining parameters from the reference data. The constraining parameters include, but not be limited to, an azimuth, a length of a segment of a power line, and a distance of a reference power line and an identified power line.

At block 406, the extraction unit 104 can identify a power line from candidate data points. The extraction unit 104 can apply a Hough transform constrained by the parameters determined from the reference data to identify the power lines. The extraction unit 104 can apply the Hough transform to analyze candidate data points and detect power lines that are parallel to the reference power lines. Additionally, the extraction unit 104 can compare a length of an identified line segment to a reference power line segment. Therefore, even if the segments are a parallel, the extraction unit 104 can determine that the line segments have an equivalent length. If, for example, the line segments do not have an equivalent length, the extraction unit 104 can determine that the identified line segment is not a power line segment. If, for example, the line segments have an equivalent length, the extraction unit 104 can determine that the identified line segment is a power line segment. The extraction unit 104 can further calculate a distance between the identified line segment and a reference line segment. The extraction unit 104 can determine whether the identified line segment is greater than or less than a threshold distance, where the threshold distance is a range. If, for example, the extraction unit 104 can determine that the distance is greater than an upper limit or less than a lower limit, the identified line segment is not a power line segment. If the extraction unit 104 can determine that the distance is within the range, the identified line segment is a power line segment.

At block 408, a georectification unit 106 can associate an image layer, including the identified power line(s) with spatial coordinates. The georectification unit 106 can associate multiple points of interest from the image data with known coordinates to coordinates in a geographic coordinate system. The geographic coordinate system can be a longitudinal and latitudinal system. The balance of the points of interest in the image data are rectified with the geographic coordinate system based on the points of interests with known coordinates. Once the balance of the points of interest are rectified, the georectification unit 106 can generate a vector describing a location of the power lines with respect to the geographic coordinate system. The geographic coordinate system can include geographic coordinates describing the target area, for example, global positioning system (GPS) coordinates longitude, latitude, and elevation coordinates, earth-centered, earth-fixed (ECEF) coordinates, or other geographic coordinate system. The vector can be generated for various formats, such shapefile or GeoJSON. In some embodiments of the present invention, the georectification unit 106, can analyze a map image, for example, the reference data map image, determine a format compatible with the map image. The georectification unit 106 can then generate the vector to be compatible with a format of the map image. The map image used to determine the compatible format does not necessarily have to include power lines. In the instance that the map image does not include power lines, the georectification unit 106 can use the vector to add power lines to the map image. In the instance that the map image includes power lines with incorrect locations, the georectification unit 106 can remove power line at incorrect locations and add power lines at updated locations. The vector can be used to generate an RBG image of the location of the power lines. Through this process, the georectification unit 106 can create or update a map 112 with an updated location of the power lines. The map 112 can be a visual depiction of the target area with computer-generated graphics highlight an updated position of a power line. For example, the map can be a satellite image of the target area with the power line at the updated location in visual distinctive color or graphics. In some embodiments of the present invention, the generation of the vector and/or updated map 112 can be performed contemporaneously with the collection of point cloud data. For example, an autonomous or manned aerial vehicle or satellite can be in flight and collecting point cloud data and transmitting the data to the system 100. The system 100 can retrieve reference data, for example, a previously generated electronic map of power lines, and update the location of the power lines in the reference data in real time. In this sense, a user can view a map with updated power line locations in real time.

Through this process, the georectification unit 106 creates a map 112 with an updated location of the power lines. The map 112 can be a human-readable map displayed on a computing device display. The map 112 can include a visual light image of a target area, for example, an image captured by a satellite or drone. The map 112 can also include a computer generated graphics image of the target area. The map 112 can further include a computer generated overlay of the identified power lines. The overlay can be highlighted to be distinct from an image of the target area.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
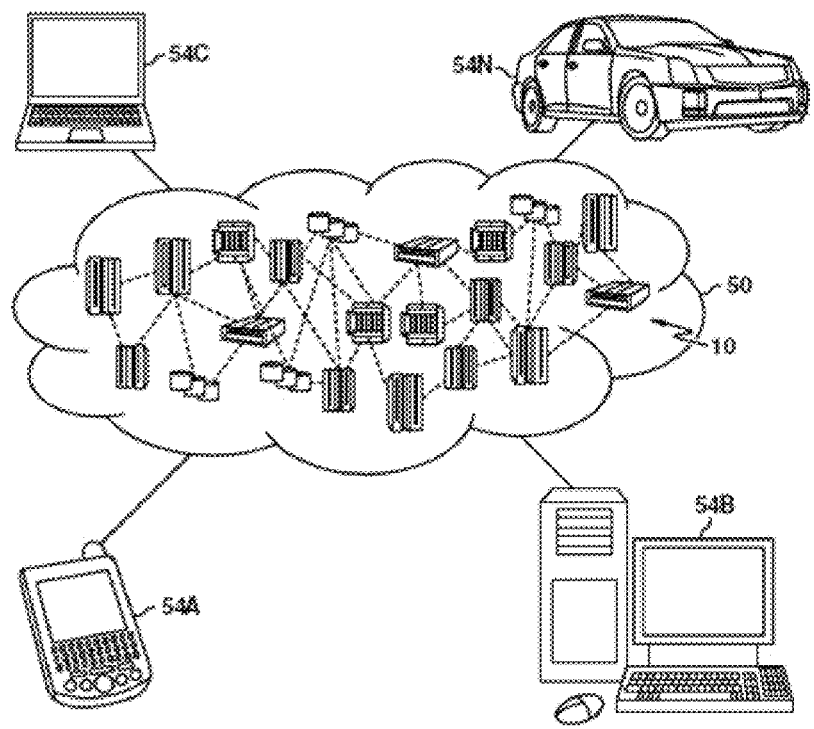
FIG. 5 illustrates a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
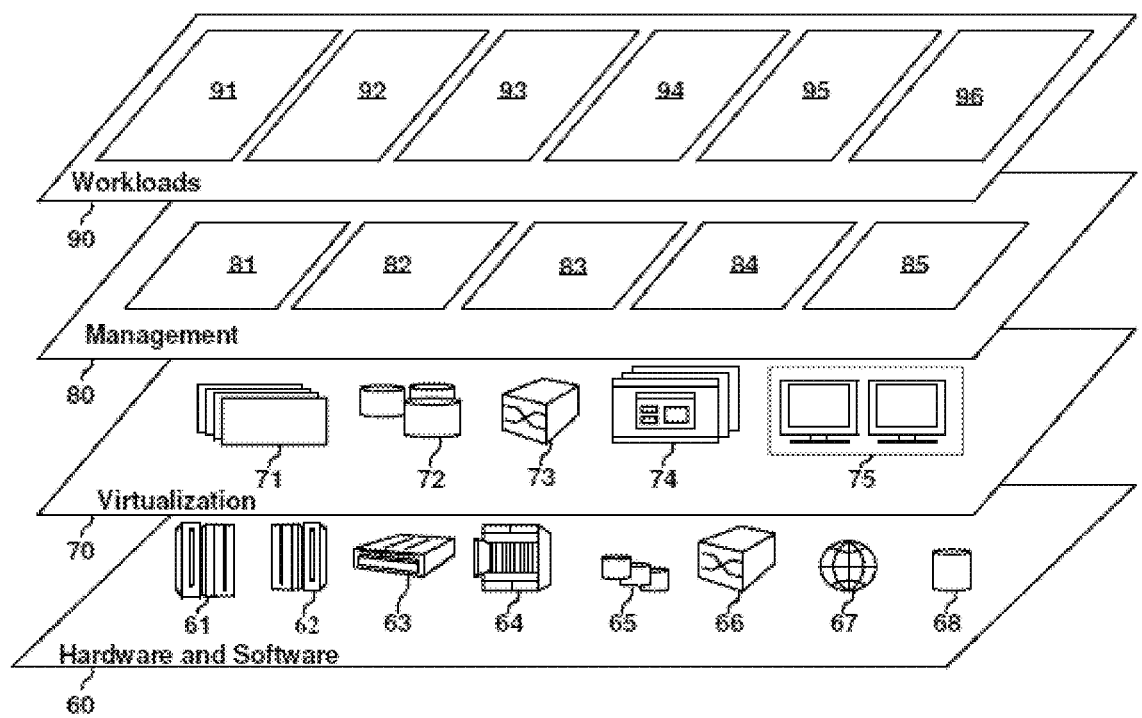
FIG. 6 illustrates abstraction model layers according to one or more embodiments of the present invention.

Referring now to FIG. 6, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and georectification 96.

Figure 7:
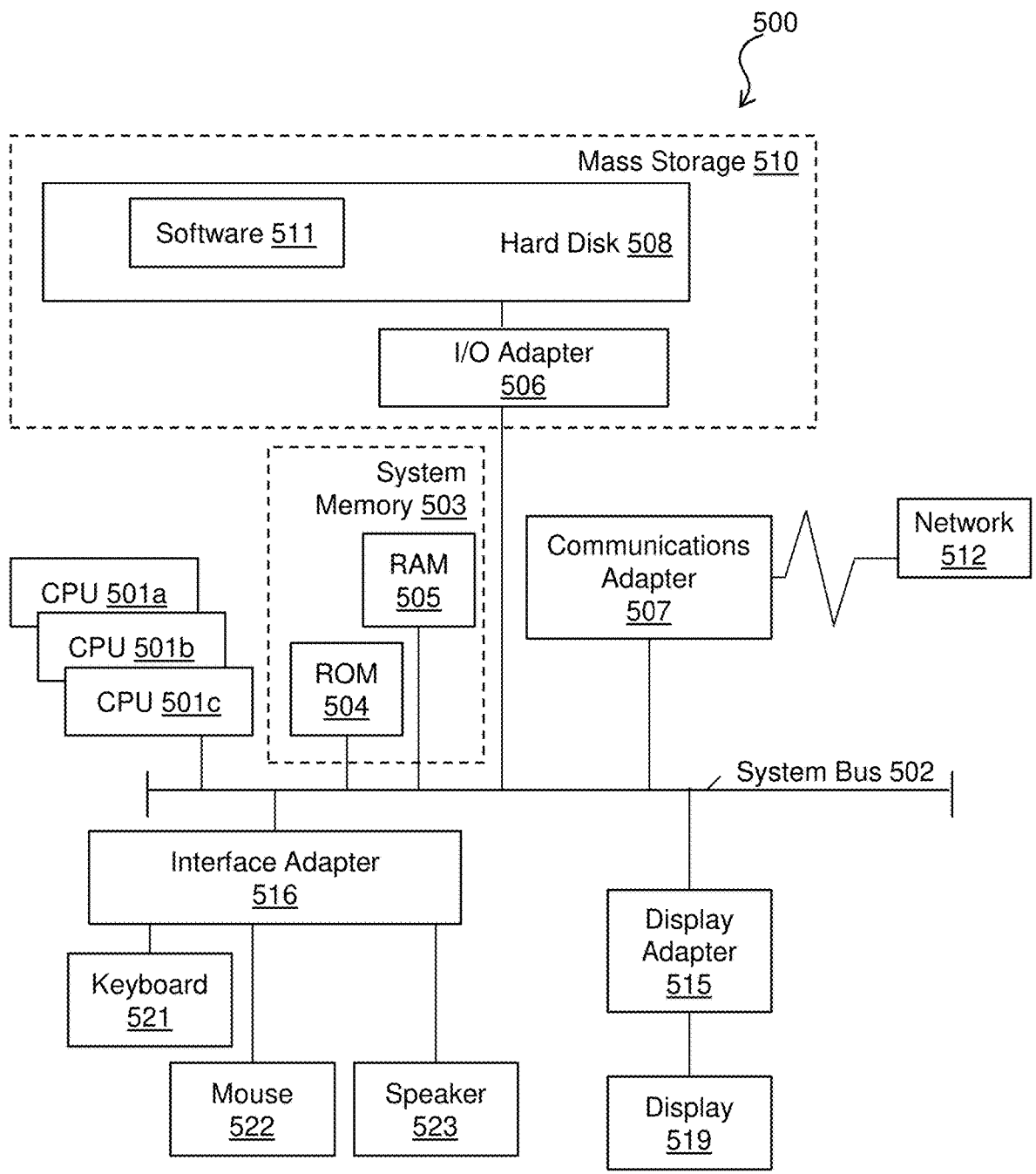
FIG. 7 illustrates a block diagram of a computer system for use in implementing one or more embodiments of the present invention.

In one or more embodiments of the present invention, the hardware/software modules in the system 100 from FIG. 1 can be implemented on the processing system 700 found in FIG. 7. Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 515, which may include a graphics controller to improve the performance of graphics intensive applications and a video controller. A keyboard 721, a mouse 722, a speaker 723, etc. can be interconnected to the system bus 502 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of 8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a processor, a point cloud data set describing a target area;
    receiving, by the processor, a first parameter describing a power line segment at an original location within the target area;
    using the processor to extract from the point cloud data set a power line segment at an updated location distinct from the original location, wherein analysis of each candidate data point of the point cloud data set is constrained by the first parameter, and wherein the first parameter causes the power line segment at the updated location to be parallel with the power line segment at the original location; and
    generating, by the processor, a vector describing the updated location of the power line segment with respect to geospatial coordinates of the target area.

2. The computer-implemented method of claim 1, wherein the first parameter is an angle of the power line segment at the original location with respect to a reference vector.

3. The computer-implemented method of claim 1, wherein the first parameter is based on reference data comprising a description of the power line at the original location, wherein the original location is an inaccurate location.

4. The computer-implemented method of claim 1 further comprising identifying a candidate power line as a competitor line by comparing a line segment of the candidate power line to the power line segment at the original location to determine whether the candidate power line segment is parallel to the power line segment at the original location.

5. The computer-implemented method of claim 4 further comprising identifying the competitor line based at least in part on a distance between the candidate power line segment to the power line segment at the original location.

6. The computer-implemented method of claim 1 further comprising identifying candidate data points by calculating a height value of each data point of the point cloud data set in relation to a topology of the target area and determining whether the height value is within a threshold range of height values.

7. The computer-implemented method of claim 1 comprising generating a map image based on the vector, wherein the map image comprises the power line segment at the updated location.

8. A system comprising:
    a memory having computer readable instructions; and
    one or more processors for executing the computer readable instructions, the computer readable instructions controlling the one or more processors to perform operations comprising:
        receiving a point cloud data set describing a target area;
        receiving a first parameter describing a power line segment at an original location within the target area;
        extracting, from the point cloud data set, a power line segment at an updated location distinct from the original location, wherein analysis of each candidate data point of the point cloud data set is constrained by the first parameter, and wherein the first parameter causes the power line segment at the updated location to be parallel with the power line segment at the original location; and generating a vector describing the updated location of the power line segment with respect to geospatial coordinates of the target area.

9. The system of claim 8, wherein the first parameter is an angle of the power line segment at the original location with respect to a reference vector.

10. The system of claim 8, wherein the first parameter is based on reference data comprising a description of the power line at the original location, wherein the original location is an inaccurate location.

11. The system of claim 8, the operations further comprising identifying a candidate power line as a competitor line by comparing a line segment of the candidate power line to the power line segment at the original location to determine whether the candidate power line segment is parallel to the power line segment at the original location.

12. The system of claim 11, the operations further comprising identifying the competitor line based at least in part on a distance between the candidate power line segment to the power line segment at the original location.

13. The system of claim 8, the operations further comprising identifying candidate data points by calculating a height value of each data point of the point cloud data set in relation to a topology of the target area and determining whether the height value is within a threshold range of height values.

14. The system of claim 8, the operations further comprising generating a map image based on the vector, wherein the map image comprises the power line segment at the updated location.

15. A computer program product comprising a computer readable storage medium having program instructions embodied therewith, the program instructions executable by a processor to cause the processor to perform operations comprising:

receiving a point cloud data set describing a target area;

receiving a first parameter describing a power line segment at an original location within the target area;

extracting, from the point cloud data set, a power line segment at an updated location distinct from the original location, wherein analysis of each candidate data point of the point cloud data set is constrained by the first parameter, and wherein the first parameter causes the power line segment at the updated location to be parallel with the power line segment at the original location; and generating a vector describing the updated location of the power line segment with respect to geospatial coordinates of the target area.

16. The computer program product of claim 15, wherein the first parameter is an angle of the power line segment at the original location with respect to a reference vector.

17. The computer program product of claim 15, wherein the first parameter is based on reference data comprising a description of the power line at the original location, wherein the original location is an inaccurate location.

18. The computer program product of claim 15, the operations further comprising identifying a candidate power line as a competitor line by comparing a line segment of the candidate power line to the power line segment at the original location to determine whether the candidate power line segment is parallel to the power line segment at the original location.

19. The computer program product of claim 18, the operations further comprising identifying the competitor line based at least in part on a distance between the candidate power line segment to the power line segment at the original location.

20. The computer program product of claim 15, the operations further comprising generating a map image based on the vector, wherein the map image comprises the power line segment at the updated location.

\* \* \* \* \*